United States Patent
Shioda

(10) Patent No.: US 11,525,044 B2
(45) Date of Patent: Dec. 13, 2022

(54) HARD-COAT-LAYER-FORMING COMPOSITION AND OPTICAL MEMBER

(71) Applicant: NIKON-ESSILOR CO., LTD., Tokyo (JP)

(72) Inventor: Goro Shioda, Yokohama (JP)

(73) Assignee: NIKON-ESSILOR CO., LTD., Tokyo (JP)

( * ) Notice: Subject to any disclaimer, the term of this patent is extended or adjusted under 35 U.S.C. 154(b) by 1048 days.

(21) Appl. No.: 16/013,211

(22) Filed: Jun. 20, 2018

(65) Prior Publication Data

US 2018/0297343 A1    Oct. 18, 2018

Related U.S. Application Data

(63) Continuation of application No. PCT/JP2016/086715, filed on Dec. 9, 2016.

(30) Foreign Application Priority Data

Dec. 25, 2015    (JP) .............................. JP2015-255224

(51) Int. Cl.
   *C09D 183/06*    (2006.01)
   *G02B 1/14*    (2015.01)
   (Continued)

(52) U.S. Cl.
   CPC .............. *C08J 7/043* (2020.01); *B32B 27/00* (2013.01); *B32B 27/26* (2013.01); *B32B 27/38* (2013.01);
   (Continued)

(58) Field of Classification Search
   CPC .. C09D 183/04; C09D 183/06; C09D 183/08; C09D 7/40; G02B 1/14; C08G 77/00; C08G 77/14; C08J 2483/06
   (Continued)

(56) References Cited

U.S. PATENT DOCUMENTS 10,227,505 B2 * 3/2019 Fukaumi ................ C08G 59/20
2007/0042173 A1    2/2007 Nagaoka et al.
(Continued)

FOREIGN PATENT DOCUMENTS

EP    2 866 062 A1    4/2015
JP    2007-86751 A    4/2007
(Continued)

OTHER PUBLICATIONS

Chinese Office Action dated Oct. 24, 2019 in corresponding Chinese Patent Application No. 201680074357.1.
(Continued)

*Primary Examiner* — Coris Fung
*Assistant Examiner* — Ritu S Shirali

(57) ABSTRACT

The present invention provides a hard-coat-layer-forming composition whereby a hard coat layer having excellent scratch resistance and cracking resistance can be formed, and an optical member. The hard-coat-layer-forming composition is a composition used to form a hard coat layer on a plastic substrate, and includes: metal oxide particles; at least one type of component X selected from the group consisting of an organic silicon compound represented by a predetermined formula, a hydrolysate thereof, and a hydrolytic condensate thereof; and at least one type of component Y selected from the group consisting of an organic silicon compound represented by a predetermined formula, a hydrolysate thereof, and a hydrolytic condensate thereof, and a glycoluril crosslinking agent, a hydrolysate thereof, and a hydrolytic condensate thereof.

4 Claims, 1 Drawing Sheet

(51) Int. Cl.
- *C09D 7/40* (2018.01)
- *B32B 27/00* (2006.01)
- *C08J 7/046* (2020.01)
- *B32B 27/26* (2006.01)
- *B32B 27/38* (2006.01)
- *C08G 77/14* (2006.01)
- *G02C 7/02* (2006.01)
- *C08J 7/043* (2020.01)
- *G02B 1/11* (2015.01)

(52) U.S. Cl.
CPC ............. *C08J 7/046* (2020.01); *C09D 7/40* (2018.01); *C09D 183/06* (2013.01); *G02B 1/11* (2013.01); *G02B 1/14* (2015.01); *C08G 77/14* (2013.01); *G02C 7/02* (2013.01)

(58) Field of Classification Search
USPC ...................................................... 106/287.1
See application file for complete search history.

(56) References Cited

U.S. PATENT DOCUMENTS

| | | |
|---|---|---|
| 2009/0297807 A1 | 12/2009 | Kojima et al. |
| 2010/0316953 A1 | 12/2010 | Suwa et al. |
| 2016/0326344 A1* | 11/2016 | Yano ............... C09D 201/10 |

FOREIGN PATENT DOCUMENTS

| | | | |
|---|---|---|---|
| JP | 2010-33021 A | 2/2010 | |
| WO | WO 2009/096050 A1 | 8/2009 | |
| WO | WO 2014/204010 A1 | 12/2014 | |
| WO | WO-2015098998 A1 * | 7/2015 | ............ C08J 7/0427 |

OTHER PUBLICATIONS

International Search Report dated Jan. 31, 2017 in corresponding International Patent Application No. PCT/JP2016/086715.
Extended European Search Report dated Jun. 19, 2019 in corresponding European Patent Application No. 16878414.8.

* cited by examiner

HARD-COAT-LAYER-FORMING COMPOSITION AND OPTICAL MEMBER

CROSS-REFERENCE TO RELATED APPLICATIONS

This application is a Continuation of PCT International Application No. PCT/JP2016/086715 filed on Dec. 9, 2016, which claims priority under 35 U.S.C. § 119(a) to Japanese Patent Application No. 2015-255224 filed on Dec. 25, 2015. The above application is hereby expressly incorporated by reference, in its entirety, into the present application.

TECHNICAL FIELD

The present disclosure relates to a hard coat layer-forming composition and an optical member.

BACKGROUND ART

It has been commonly performed to additionally form a hard coat layer on a surface of a plastic base such as a plastic lens in order to provide scratch resistance to the plastic base.

For instance, in Patent Literature 1, a composition containing metal oxide particles and γ-glycidoxypropyltrimethoxysilane is used to form a hard coat layer.

CITATION LIST

Patent Literature

Patent Literature 1: JP 2010-33021 A

SUMMARY OF INVENTION

The present disclosure relates to a hard coat layer-forming composition used to form a hard coat layer on a plastic base, the hard coat layer-forming composition comprising: metal oxide particles; a component X that is at least one selected from the group consisting of an organic silicon compound represented by Formula (1) stated later, a hydrolysate thereof and a hydrolyzed condensate thereof; and a component Y that is at least one selected from the group consisting of an organic silicon compound represented by Formula (2) stated later, a hydrolysate thereof and a hydrolyzed condensate thereof, and a glycoluril crosslinking agent represented by Formula (3), a hydrolysate thereof and a hydrolyzed condensate thereof.

DESCRIPTION OF EMBODIMENTS

Figure 1:
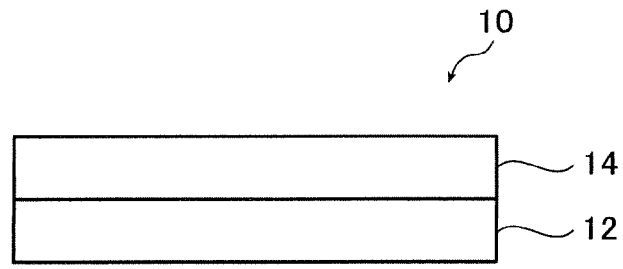
FIG. 1 is a cross-sectional view of a first embodiment of an optical member.

In recent years, an optical member including a plastic base is required to be excellent not only in scratch resistance but also in so-called crack resistance, i.e., properties to suppress occurrence of cracks when a load (pressure) is applied.

The present inventor studied properties of a hard coat layer described in Patent Literature 1 and found that its scratch resistance satisfies specified demand but its crack resistance needs to be further improved.

In particular, scratch resistance and crack resistance are in a trade-off relationship, and it is difficult to achieve both properties at high level.

In view of the situation described above, the present embodiment provides a hard coat layer-forming composition that can form a hard coat layer having excellent scratch resistance and crack resistance.

In addition, the present embodiment provides an optical member including the hard coat layer formed from the hard coat layer-forming composition.

Preferred examples of the hard coat layer-forming composition and the optical member according to the embodiment are described below in detail.

In the present description, any numerical range specified using "to" refers to a range including the upper and lower limits of the range. For example, the numerical range of "10 to 20" includes "10" and "20."

The hard coat layer-forming composition of the embodiment is characterized in that use is made of, in combination, an organic silicon compound (or its hydrolysate or hydrolyzed condensate) in which a total number of carbon atoms of an alkylene group connecting an epoxy group and a silicon atom is small, and either an organic silicon compound (or its hydrolysate or hydrolyzed condensate) in which a total number of carbon atoms of an alkylene group connecting an epoxy group and a silicon atom is large or a glycoluril crosslinking agent (or its hydrolysate or hydrolyzed condensate).

The hard coat layer-forming composition (hereinafter also simply called "composition") contains metal oxide particles, a component X to be described later, and a component Y to be described later.

First, components contained in the composition are described below in detail.

<(A) Metal Oxide Particles>

The composition contains the metal oxide particles.

For the metal oxide particles, known metal oxide particles can be used. One preferred example of the metal oxide particles is particles of an oxide of at least one metal selected from Al, Sn, Sb, Ta, Ce, La, Fe, Zn, W, Zr, In and Ti. In other words, a preferred example of the metal oxide particles is particles containing oxide(s) of the above metals.

The metal oxide particles may contain, among the metals listed above, one type of metal (metallic atoms) alone or two or more types of metals (metallic atoms). In short, the metal oxide particles may be composite oxide particles.

In particular, for components constituting (forming) the metal oxide particles, preferred are titanium oxide, tin oxide, zirconium oxide and a composite oxide thereof, and more preferred are tin oxide, zirconium oxide and a composite oxide thereof, because at least one of scratch resistance and crack resistance can be more excellent (hereinafter also simply expressed "because the effect(s) can be more excellent").

The average particle size of the metal oxide particles is not particularly limited, and it is generally preferred to select the size in the range from 1 to 100 nm. When the average particle size is within the above range, the composition is excellent in dispersion stability while whitening of a cured product can be further suppressed.

Various functional groups may optionally be introduced to surfaces of the metal oxide particles.

<(B) Organic Silicon Compound>

The composition contains the component X that is at least one selected from the group consisting of an organic silicon compound represented by Formula (1), a hydrolysate thereof and a hydrolyzed condensate thereof. The component X may include two or more selected from the group consisting of an organic silicon compound represented by Formula (1), a hydrolysate thereof, and a hydrolyzed condensate thereof.

$$(R_A\text{-}L_A)_n\text{-}Si\text{—}(X)_{4-n} \quad \text{Formula (1)}$$

In Formula (1), $R_A$ denotes an epoxy group.

$L_A$ denotes an alkylene group that has 5 or less total carbon atoms and that optionally includes a heteroatom. The total number of carbon atoms in the alkylene group is 5 or less and is preferably 4 or less because the effect(s) can be more excellent. The lower limit thereof is not particularly specified and is normally not less than 1. The total carbon atoms refer to the total number of carbon atoms included in the alkylene group, and when the alkylene group is for instance —$C_3H_6$—O—$CH_2$—, the total number of carbon atoms is calculated to be 4.

The alkylene group may include a heteroatom. The type of the heteroatom is not particularly limited, and examples thereof include an oxygen atom (—O—), a sulfur atom (—S—) and a nitrogen atom (—NH—). The position where the heteroatom is introduced to the alkylene group is not particularly limited and may be an end of the alkylene group or an intermediate point of a chain.

The alkylene group may be a linear or branched group. A cyclic structure may also be included.

In particular, a preferred example of $L_A$ is an alkylene group that has 5 or less total carbon atoms and that optionally includes an oxygen atom because the effect(s) can be more excellent.

In cases where there are a plurality of $L_A$ moieties, the $L_A$ moieties may be the same or different.

X denotes a hydrolyzable group.

The hydrolyzable group is directly connected to Si (silicon atom) and may promote a hydrolysis reaction and/or a condensation reaction, and examples thereof include an alkoxy group, a halogen atom, an acyloxy group, an alkenyloxy group and an isocyanate group.

In cases where there are a plurality of X moieties, the X moieties may be the same or different.

n denotes an integer of 1 to 3. In particular, n is preferably an integer of 1 because the effect(s) can be more excellent.

A hydrolysate of the organic silicon compound represented by Formula (1) refers to a compound obtained through hydrolysis of one or more hydrolyzable groups in the organic silicon compound represented by Formula (1). The hydrolysate may be a product obtained through hydrolysis of all the hydrolyzable groups (complete hydrolysate) or a product obtained through hydrolysis of some of the hydrolyzable groups (partial hydrolysate). That is, the hydrolysate may be a complete hydrolysate, a partial hydrolysate or a mixture thereof.

A hydrolyzed condensate of the organic silicon compound represented by Formula (1) refers to a compound obtained through hydrolysis of one or more hydrolyzable groups in the organic silicon compound represented by Formula (1) and subsequent condensation of the resulting hydrolysate. The hydrolyzed condensate may be a product obtained through hydrolysis of all the hydrolyzable groups and subsequent condensation of the whole of the resulting hydrolysate (completely hydrolyzed condensate) or a product obtained through hydrolysis of some of the hydrolyzable groups and subsequent condensation of part of the resulting hydrolysate (partially hydrolyzed condensate). That is, the hydrolyzed condensate may be a completely hydrolyzed condensate, a partially hydrolyzed condensate or a mixture thereof.

<(C) Organic Silicon Compound and (D) Glycoluril Crosslinking Agent)>

The composition contains the component Y that is at least one selected from the group consisting of an organic silicon compound represented by Formula (2), a hydrolysate thereof and a hydrolyzed condensate thereof, and a glycoluril crosslinking agent represented by Formula (3), a hydrolysate thereof and a hydrolyzed condensate thereof. The component Y may include two or more of the compounds listed above.

[Chemical Formula 1]

$$(R_B\text{—}L_B)_m\text{—}Si\text{—}(X)_{4-m} \quad \text{Formula (2)}$$

Formula (3)

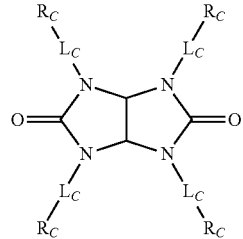

In Formula (2), $R_B$ denotes an epoxy group.

In cases where there are a plurality of $R_B$ moieties, the $R_B$ moieties may be the same or different.

$L_B$ denotes an alkylene group that has 6 or more total carbon atoms and that optionally includes a heteroatom. The total number of carbon atoms in the alkylene group is 6 or more and is preferably 8 or more because the effect(s) can be more excellent. The upper limit thereof is not particularly specified and is normally not more than 20. The total carbon atoms refer to the total number of carbon atoms included in the alkylene group, and when the alkylene group is for instance —$C_8H_{16}$—O—$CH_2$—, the total number of carbon atoms is calculated to be 9.

The alkylene group may include a heteroatom. The type of the heteroatom is not particularly limited, and examples thereof include an oxygen atom (—O—), a sulfur atom (—S—) and a nitrogen atom (—NH—). The position where the heteroatom is introduced to the alkylene group is not particularly limited and may be an end of the alkylene group or an intermediate point of a chain.

The alkylene group may be a linear or branched group. A cyclic structure may also be included.

In particular, a preferred example of $L_B$ is an alkylene group that has 6 or more total carbon atoms and that optionally includes an oxygen atom because the effect(s) can be more excellent.

In cases where there are a plurality of $L_B$ moieties, the $L_B$ moieties may be the same or different.

X denotes a hydrolyzable group. The definition of the hydrolyzable group and a relevant preferred range are as described above.

m denotes an integer of 1 to 3. In particular, m is preferably an integer of 1 because the effect(s) can be more excellent.

A hydrolysate of the organic silicon compound represented by Formula (2) refers to a compound obtained through hydrolysis of one or more hydrolyzable groups in the organic silicon compound represented by Formula (2). The hydrolysate may be a product obtained through hydrolysis of all the hydrolyzable groups (complete hydrolysate)

or a product obtained through hydrolysis of some of the hydrolyzable groups (partial hydrolysate). That is, the hydrolysate may be a complete hydrolysate, a partial hydrolysate or a mixture thereof.

A hydrolyzed condensate of the organic silicon compound represented by Formula (2) refers to a compound obtained through hydrolysis of one or more hydrolyzable groups in the organic silicon compound represented by Formula (2) and subsequent condensation of the resulting hydrolysate. The hydrolyzed condensate may be a product obtained through hydrolysis of all the hydrolyzable groups and subsequent condensation of the whole of the resulting hydrolysate (completely hydrolyzed condensate) or a product obtained through hydrolysis of some of the hydrolyzable groups and subsequent condensation of part of the resulting hydrolysate (partially hydrolyzed condensate). That is, the hydrolyzed condensate may be a completely hydrolyzed condensate, a partially hydrolyzed condensate or a mixture thereof.

In Formula (3), each Rc independently represents a hydroxy group, an alkoxy group or an alkoxysilyl group.

The number of carbon atoms in the alkoxy group is not particularly limited and is preferably 1 to 6.

The alkoxysilyl group refers to a silyl group having at least one alkoxy group and may be, for example, any of a dialkylalkoxysilyl group, an alkyldialkoxysilyl group and a trialkoxysilyl group.

The number of carbon atoms in the alkoxy group included in the alkoxysilyl group is not particularly limited and is preferably 1 to 4.

Each $L_C$ independently represents an alkylene group that has 2 or more total carbon atoms and that optionally includes a heteroatom. The total number of carbon atoms in the alkylene group is 2 or more and is preferably 2 to 5 because the effect(s) can be more excellent.

The alkylene group may include a heteroatom. The type of the heteroatom is not particularly limited, and examples thereof include an oxygen atom (—O—), a sulfur atom (—S—) and a nitrogen atom (—NH—). The position where the heteroatom is introduced to the alkylene group is not particularly limited and may be an end of the alkylene group or an intermediate point of a chain.

The alkylene group may be a linear or branched group. A cyclic structure may also be included.

In particular, a preferred example of $L_C$ is an alkylene group of 2 or more total carbon atoms because the effect(s) can be more excellent.

A hydrolysate of the glycoluril crosslinking agent represented by Formula (3) refers to a compound obtained through hydrolysis of alkoxysilyl groups in the glycoluril crosslinking agent represented by Formula (3) in which at least one Rc moiety is the alkoxysilyl group. The hydrolysate may be a product obtained through hydrolysis of all the alkoxysilyl groups (complete hydrolysate) or a product obtained through hydrolysis of some of the alkoxysilyl groups (partial hydrolysate). That is, the hydrolysate may be a complete hydrolysate, a partial hydrolysate or a mixture thereof.

A hydrolyzed condensate of the glycoluril crosslinking agent represented by Formula (3) refers to a compound obtained through hydrolysis of alkoxysilyl groups in the glycoluril crosslinking agent represented by Formula (3) in which at least one Rc moiety is the alkoxysilyl group and subsequent condensation of the resulting hydrolysate. The hydrolyzed condensate may be a product obtained through hydrolysis of all the alkoxysilyl groups and subsequent condensation of the whole of the resulting hydrolysate (completely hydrolyzed condensate) or a product obtained through hydrolysis of some of the alkoxysilyl groups and subsequent condensation of part of the resulting hydrolysate (partially hydrolyzed condensate). That is, the hydrolyzed condensate may be a completely hydrolyzed condensate, a partially hydrolyzed condensate or a mixture thereof.

<Optional Component>

The composition contains at least the metal oxide particles, the component X and the component Y as described above and may further contain other components.

Optional components that may be contained in the composition are described below.

(Solvent)

The composition may contain a solvent. The solvent may be water or an organic solvent.

The organic solvent is not particularly limited in type, and examples thereof include: alcoholic solvents such as methanol, ethanol, propanol, butanol, methoxyethanol, ethoxyethanol, butoxyethanol, methoxypropanol, ethoxypropanol and diacetone alcohol; ketone solvents such as acetone, methyl ethyl ketone, cyclohexanone, 2-heptanone and 3-heptanone; ether solvents such as diethyl ether, tetrahydrofuran and ethylene glycol dimethyl ether; ester solvents such as methyl acetate, butyl acetate, benzyl benzoate, dimethyl carbonate, ethylene carbonate, γ-butyrolactone and caprolactone; hydrocarbon solvents such as benzene, toluene, ethylbenzene and tetralin; halogenated hydrocarbon solvents such as dichloromethane, trichloroethane and chlorobenzene; amide or cyclic amide solvents such as N,N-dimethylformamide, N,N-dimethylacetamide and N-methylpyrrolidone (N-methyl-2-pyrrolidone); sulfone solvents such as dimethyl sulfone; and sulfoxide solvents such as dimethyl sulfoxide.

(Surfactant)

The composition may contain a surfactant. When a surfactant is contained, the composition can have improved coatability.

The surfactant is not particularly limited in type and any known surfactant may be used. Examples of the surfactant include nonionic surfactants and ionic surfactants (e.g., anionic surfactants, cationic surfactants, amphoteric surfactants).

(Curing Catalyst)

The composition may contain a curing catalyst that accelerates a hydrolysis reaction and a condensation reaction of the organic silicon compound represented by Formula (1) or (2) or the glycoluril crosslinking agent represented by Formula (3) (in cases where $R_e$ is an alkoxysilyl group) described above.

The curing catalyst is not particularly limited in type and any known curing catalyst may be used. Examples of the curing catalyst include: acetylacetone aluminum; and carboxylates of such metals as zinc, titanium, zirconium, tin and magnesium.

<Hard Coat Layer-Forming Composition>

The composition contains the foregoing various components.

The metal oxide particle content is not particularly limited. In most cases, the metal oxide particle content falls within a range from 1 to 30 vol % with respect to the volume of the total solids in the hard coat layer-forming composition, and within the range, is preferably not less than 5 vol %, more preferably not less than 7.5 vol % and even more preferably not less than 10 vol %, and preferably not more than 28 vol %, more preferably not more than 20 vol %, even more preferably not more than 15 vol % and particularly preferably not more than 12.5 vol % because the effect(s)

can be more excellent. The solids above refer to components forming a hard coat layer and normally do not include the solvent. Even if a component is a liquid, this component is considered as a solid and its volume is included as long as the component is one element forming the hard coat layer.

The total content of the component X and the component Y is not particularly limited. In most cases, the total content falls within a range from 20 to 90 wt % with respect to the weight of the total solids in the hard coat layer-forming composition, and within the range, is preferably 30 to 80 wt % and more preferably 40 to 70 wt % because the effect(s) can be more excellent.

The amount of the component X in the total amount of the component X and the component Y is not particularly limited and is preferably 75 to 97 mol %, more preferably 85 to 95 mol %, even more preferably more than 85 mol % but not more than 95 mol %, and particularly preferably 90 to 96 mol % with respect to the total molar quantity of the component X and the component Y because the effect(s) can be more excellent.

The amount of the component Y in the total amount of the component X and the component Y is not particularly limited and is preferably not less than 3 mol %, more preferably not less than 5 mol % and even more preferably not less than 7.5 mol % and preferably not more than 25 mol %, more preferably not more than 15 mol %, even more preferably less than 15 mol % and particularly preferably not more than 10 mol % with respect to the total molar quantity of the component X and the component Y because the effect(s) of the invention can be more excellent.

When the composition contains the solvent, the solid concentration of the composition is preferably 20 to 40 wt % and more preferably 25 to 35 wt % for the sake of handleability.

The method of producing the hard coat layer-forming composition is not limited, and any known method is applicable. One exemplary method involves: preparing a first solution by charging the organic silicon compound represented by Formula (1) into a first reaction vessel to prompt a hydrolysis reaction and a condensation reaction; preparing a second solution by charging the organic silicon compound represented by Formula (2) into a second reaction vessel to prompt a hydrolysis reaction and a condensation reaction; and mixing the first solution and the second solution while adding the metal oxide particles and optional components to the mixture, thereby preparing the composition. Another exemplary method involves: mixing the metal oxide particles, the organic silicon compound represented by Formula (1), the organic silicon compound represented by Formula (2) and optional components; and prompting a hydrolysis reaction and a condensation reaction if necessary, thereby preparing the composition.

Optical Member (First Embodiment)

FIG. 1 is a cross-sectional view of a first embodiment of an optical member.

An optical member 10 shown in FIG. 1 includes a plastic base 12 and a hard coat layer 14 disposed on the plastic base 12. The hard coat layer 14 is a layer formed from the hard coat layer-forming composition described above.

While the plastic base 12 and the hard coat layer 14 are arranged so as to be in direct contact with each other in FIG. 1, the arrangement is not limited thereto, and another layer (e.g., a primer layer) may be disposed between the plastic base 12 and the hard coat layer 14 as described later in detail.

That is, the hard coat layer 14 may be disposed directly on or indirectly, via another layer, above the plastic base 12.

Members included in the optical member 10 are described below in detail.

(Plastic Base)

A plastic base is a base constituted of plastic.

The plastic (so-called resin) constituting the plastic base is not particularly limited in type, and examples thereof include acrylic resin, thiourethane resin, methacrylic resin, allyl resin, episulfide resin, polycarbonate resin, polyurethane resin, polyester resin, polystyrene resin, polyethersulfone resin, poly-4-methylpentene-1 resin, diethylene glycol bis(allyl carbonate) resin (CR-39), polyvinyl chloride resin, halogen-containing copolymer, and sulfur-containing copolymer.

For the plastic base, a plastic lens base is preferably used because it is advantageous for application to a lens.

The plastic lens base may be a finished product having desired optical surfaces on both sides (lens for spectacles), a semi-finished product with its convex surface having been finished to a desired shape (semi-finished lens), or a lens blank having not undergone lens processing such as grinding and polishing.

The thickness of the plastic base is not particularly limited and, in most cases, falls within the range from about 1 to about 30 mm for the sake of handleability.

The plastic base need not be transparent as long as it is translucent, and may be colored.

While the plastic base 12 has flat surfaces in FIG. 1, the surface shape thereof is not particularly limited and selected from given shapes such as a convex face and a concave face.

(Hard Coat Layer)

A hard coat layer is a layer that is disposed on or above the plastic base and provides scratch resistance and crack resistance to the resultant optical member. The plastic base may be provided on its both sides with the hard coat layers.

The hard coat layer is a layer formed from the hard coat layer-forming composition described above.

The method of forming the hard coat layer is not particularly limited, and one exemplary method involves applying the hard coat layer-forming composition described above onto the plastic base to form a coating, followed by curing treatment.

The method of applying the hard coat layer-forming composition onto the plastic base is not particularly limited, and any known method (e.g., dip coating, spin coating, spray coating, flow coating) may be employed. When dip coating is employed for instance, the plastic base is immersed in the hard coat layer-forming composition and then pulled out and dried, whereby a coating with a predetermined thickness can be formed on the plastic base.

The thickness of the coating formed on the plastic base is not particularly limited and suitably selected so as to allow the resulting hard coat layer to have a predetermined thickness.

Application of the hard coat layer-forming composition onto the plastic base may optionally be followed by drying treatment to thereby remove the solvent. The remaining solvent is preferably removed because, owing to this, microcracks or voids caused by evaporation and expansion of the solvent are prevented from occurring in the hard coat layer during curing treatment to be described later.

For the method of the drying treatment, a hot air dryer or the like may be used, and heating treatment may be carried out at a temperature of 30° C. to 70° C.

The method of the curing treatment is not particularly limited, and heating treatment is normally carried out.

The conditions of the heating treatment are not particularly limited, and it is generally preferred to carry out the heating treatment at a temperature of 90° C. to 120° C. for 1 to 5 hours.

The thickness of the hard coat layer is not particularly limited and is preferably 0.5 to 6 μm, more preferably 1 to 5 μm and even more preferably 2 to 4 μm because the effect(s) can be more excellent.

The above thickness is the average thickness, which is obtained by measuring the thickness of the hard coat layer at given five points and calculating the arithmetic mean of the measurements.

When the refractive index of the hard coat layer is about the same as the refractive index of the plastic base, it is possible to further suppress generation of interference fringes and decrease in transmittance that may be caused by reflection at the interface between the plastic base and the hard coat layer. The refractive index of the hard coat layer as above can be adjusted by adjusting the type of used raw materials and the type and amount of used metal oxide particles.

The embodiment of the optical member is not particularly limited to that shown in FIG. 1 and may include other layers as described later in detail.

Optical Member (Second Embodiment)

Figure 2:
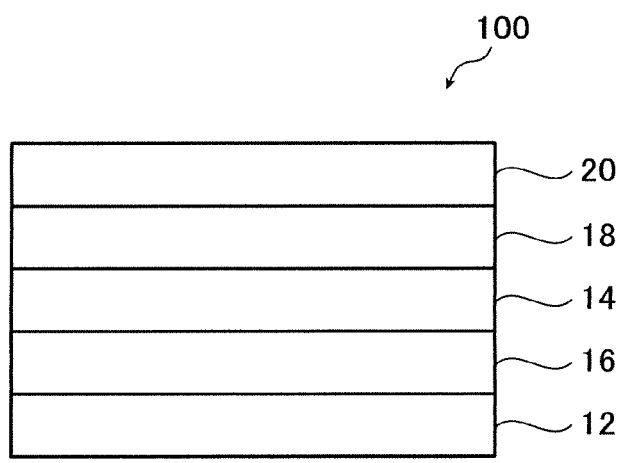
FIG. 2 is a cross-sectional view of a second embodiment of an optical member.

FIG. 2 is a cross-sectional view of a second embodiment of an optical member.

An optical member 100 shown in FIG. 2 includes the plastic base 12, a primer layer 16 disposed on the plastic base 12, the hard coat layer 14 disposed on the primer layer 16, an antireflective layer 18 disposed on the hard coat layer 14, and a water and oil repellent layer 20 disposed on the antireflective layer 18.

Since the optical member 100 shown in FIG. 2 has the same layers as the optical member 10 shown in FIG. 1 except the primer layer 16, the antireflective layer 18 and the water and oil repellent layer 20, like constituent elements are denoted by the same reference numerals and their descriptions are omitted.

In the following, the structures of the primer layer 16, the antireflective layer 18 and the water and oil repellent layer 20 are described in detail.

(Primer Layer)

The primer layer is a layer disposed between the plastic base and the hard coat layer and serves to improve adhesion of the hard coat layer to the plastic base.

Materials constituting the primer layer are not particularly limited, and any known materials may be used. For instance, resin is mainly used. The resin for use is not particularly limited in type, and examples thereof include urethane resin, epoxy resin, phenol resin, polyimide resin, polyester resin, bismaleimide resin and polyolefin resin.

The primer layer may optionally contain a component other than the resin. For instance, the primer layer may contain inorganic particles. Exemplary inorganic particles include metal particles and metal oxide particles.

When the refractive index of the primer layer is about the same as the refractive index of the plastic base, it is possible to further suppress generation of interference fringes and decrease in transmittance that may be caused by reflection at the interface between the plastic base and the primer layer. The refractive index of the primer layer as above can be adjusted by adjusting the type of the resin and the type and amount of the inorganic particles.

The method of forming the primer layer is not particularly limited, and any known method may be employed. One exemplary method involves applying a primer layer-forming composition containing a predetermined resin onto the plastic base, optionally followed by curing treatment, thereby forming the primer layer.

The method of applying the primer layer-forming composition is not particularly limited, and for example, the method of applying the hard coat layer-forming composition described above can be employed.

The thickness of the primer layer is not particularly limited and is preferably selected within the range from 0.3 to 2 μm because the effect(s) can be more excellent.

(Antireflective Layer)

The antireflective layer is a layer having a function of preventing the reflection of incident light. Specifically, the antireflective layer preferably has low reflection characteristics over the entire visible range from 400 nm to 700 nm (wide-band low reflection characteristics). Physical properties such as abrasion resistance, heat resistance and chemical resistance may be imparted to the optical member through provision of the antireflective layer.

The antireflective layer is not particularly limited in structure and may be of a single layer structure or a multilayer structure.

In the case of multilayer structure, it is preferable to have the structure in which a low refractive index layer(s) and a high refractive index layer(s) are alternately stacked. Exemplary materials constituting the high refractive index layer include oxides of titanium, zircon, aluminum, tantalum and lanthanum. Exemplary materials constituting the low refractive index layer include oxides such as silica.

For the antireflective layer, a wet antireflective layer using hollow silicon oxide may be used.

The method of producing the antireflective layer is not particularly limited, and preferred examples thereof include dry methods such as vacuum evaporation, sputtering, ion plating, ion-beam assisted deposition and CVD.

The thickness of the antireflective layer is typically 0.2 to 0.6 μm because of its characteristics.

<Water and Oil Repellent Layer>

The water and oil repellent layer is a layer having water and oil repellency. Preferably, the water and oil repellent layer is disposed uppermost (as the outermost layer) in the optical member.

The water and oil repellent layer decreases surface energy of the optical member whereby the optical member can have improved contamination preventing function. In addition, the water and oil repellent layer improves sliding properties of a surface of the optical member whereby the optical member can have improved abrasion resistance.

A material (water and oil repellent) constituting the water and oil repellent layer is not particularly limited, and examples thereof include a compound containing fluorine atoms and a compound containing silicon atoms. In particular, a fluorine-containing silane compound is preferably used because this brings about further excellent water and oil repellency.

The fluorine-containing silane compound is a compound having a hydrolyzable group bonded to a silicon atom and also having a fluorine atom. The definition of the hydrolyzable group is as described above. The fluorine-containing silane compound preferably contains a perfluoroalkyl group or a perfluoropolyether group.

The method of forming the water and oil repellent layer is not particularly limited and varies depending on the used material. For example, when the fluorine-containing silane compound as above is used, one method may be employed which involves applying a water and oil repellent layer-forming composition containing the fluorine-containing silane compound onto a predetermined base, optionally followed by curing treatment.

The method of applying the water and oil repellent layer-forming composition is not particularly limited, and for example, the method of applying the hard coat layer-forming composition described above can be employed. For example, when dip coating is used, one coating method may be employed which involves immersing the plastic base in the water and oil repellent layer-forming composition obtained by dissolving the fluorine-containing silane compound in an organic solvent, and then pulling out the plastic base with certain conditions.

Examples of the organic solvent for use in the above method include perfluorohexane, perfluoro-4-methoxybutane, perfluoro-4-ethoxybutane and m-xylene hexafluoride.

When the fluorine-containing silane compound is diluted with the organic solvent, the concentration of the compound is preferably 0.01 to 0.5 wt % and more preferably 0.03 to 0.1 wt %. With a concentration of 0.01 wt % or higher, the water and oil repellent function further increases. With a concentration of 0.5 wt. % or lower, uneven coating can be prevented while material costs can be lowered.

While the method using the water and oil repellent layer-forming composition is described in detail in the foregoing, the water and oil repellent layer may be formed by a dry method such as vacuum evaporation according to the material for use.

The thickness of the water and oil repellent layer is not particularly limited, and it is generally preferred to select the thickness in the range from 5 to 20 nm.

EXAMPLES

The present disclosure is described below more specifically by way of examples. However, the present disclosure should not be construed as being limited to the following examples.

<Preparation of Hard Coat Layer-Forming Composition: H-1>
(1) Preparation of Hydrolysate To a reaction vessel, 197 parts by weight of an organic silicon compound-1 (manufactured by Shin-Etsu Chemical Co., Ltd.; commercial name: KBM-403; $R_A$: epoxy group, $L_A$: —CH$_2$OC$_3$H$_6$—, n: 1) was charged, and 45 parts by weight of 0.1 N aqueous hydrochloric acid solution was gradually added dropwise to the organic silicon compound-1 under stirring of the organic silicon compound-1. Thereafter, the mixture was stirred for a whole day and night, thereby obtaining a mixture X1 containing a hydrolysate and a partially hydrolyzed condensate of the organic silicon compound-1.

(2) Preparation of Hard Coat Layer-Forming Composition

To the mixture X1 obtained as above, 356 parts by weight of colloidal titanium oxide (manufactured by JGC Catalysts and Chemicals Ltd.; commercial name: NE58) with a solid content of 30% as metal oxide particles, 16 parts by weight of acetylacetone aluminum as a metal catalyst, 385 parts by weight of methyl alcohol, and 1 part by weight of surfactant (manufactured by Dow Corning Toray Co., Ltd.; commercial name: L7001) were added, and the resulting mixture was stirred to thereby obtain a hard coat layer-forming composition H-1.

<Preparation of Hard Coat Layer-Forming Composition: H-2>
(1) Preparation of Hydrolysate To a reaction vessel, 199 parts by weight of an organic silicon compound-2 (manufactured by Shin-Etsu Chemical Co., Ltd.; commercial name: KBM-4803; $R_B$: epoxy group, $L_B$: —CH$_2$OC$_8$H$_{16}$—, m: 1) was charged, and 34 parts by weight of 0.1 N aqueous hydrochloric acid solution was gradually added dropwise to the organic silicon compound-2 under stirring of the organic silicon compound-2. Thereafter, the mixture was stirred for a whole day and night, thereby obtaining a mixture Y2 containing a hydrolysate and a partially hydrolyzed condensate of the organic silicon compound-2.

(2) Preparation of Hard Coat Layer-Forming Composition

To the mixture Y2 obtained as above, 360 parts by weight of colloidal titanium oxide (manufactured by JGC Catalysts and Chemicals Ltd.; commercial name: NE58) with a solid content of 30% as metal oxide particles, 16 parts by weight of acetylacetone aluminum as a metal catalyst, 390 parts by weight of methyl alcohol, and 1 part by weight of surfactant (manufactured by Dow Corning Toray Co., Ltd.; commercial name: L7001) were added, and the resulting mixture was stirred to thereby obtain a hard coat layer-forming composition H-2.

<Preparation of Hard Coat Layer-Forming Composition: H-3>
(1) Preparation of Hydrolysate To a reaction vessel, 184 parts by weight of an organic silicon compound-1 (manufactured by Shin-Etsu Chemical Co., Ltd.; commercial name: KBM-403) was charged, and 42 parts by weight of 0.1 N aqueous hydrochloric acid solution was gradually added dropwise to the organic silicon compound-1 under stirring of the organic silicon compound-1. Thereafter, the mixture was stirred for a whole day and night, thereby obtaining a mixture X3 containing a hydrolysate and a partially hydrolyzed condensate of the organic silicon compound-1.

To another reaction vessel, 13 parts by weight of an organic silicon compound-2 (manufactured by Shin-Etsu Chemical Co., Ltd.; commercial name: KBM-4803; $R_B$: epoxy group, $L_B$: —CH$_2$OC$_8$H$_{16}$—, m: 1) was charged, and 1 part by weight of 0.1 N aqueous hydrochloric acid solution was gradually added dropwise to the organic silicon compound-2 under stirring of the organic silicon compound-2. Thereafter, the mixture was stirred for a whole day and night, thereby obtaining a mixture Y3 containing a hydrolysate and a partially hydrolyzed condensate of the organic silicon compound-2.

(2) Preparation of Hard Coat Layer-Forming Composition

The mixture X3 and the mixture Y3 obtained as above were mixed.

To the thus-obtained mixture, 356 parts by weight of colloidal titanium oxide (manufactured by JGC Catalysts and Chemicals Ltd.; commercial name: NE58) with a solid content of 30% as metal oxide particles, 16 parts by weight of acetylacetone aluminum as a metal catalyst, 388 parts by weight of methyl alcohol, and 1 part by weight of surfactant (manufactured by Dow Corning Toray Co., Ltd.; commercial name: L7001) were added, and the resulting mixture was stirred to thereby obtain a hard coat layer-forming composition H-3.

<Preparation of Hard Coat Layer-Forming Composition: H-4>
(1) Preparation of Hydrolysate To a reaction vessel, 172 parts by weight of an organic silicon compound-1 (manufactured by Shin-Etsu Chemical Co., Ltd.; commercial name: KBM-403) was charged, and 39 parts by weight of 0.1 N aqueous hydrochloric acid solution was gradually added dropwise to the organic silicon compound-1 under stirring of the organic silicon compound-1. Thereafter, the mixture was stirred for a whole day and night, thereby obtaining a mixture X4 containing a hydrolysate and a partially hydrolyzed condensate of the organic silicon compound-1.

To another reaction vessel, 25 parts by weight of an organic silicon compound-2 (manufactured by Shin-Etsu Chemical Co., Ltd.; commercial name: KBM-4803) was charged, and 1 part by weight of 0.1 N aqueous hydrochloric acid solution was gradually added dropwise to the organic silicon compound-2 under stirring of the organic silicon compound-2. Thereafter, the mixture was stirred for a whole day and night, thereby obtaining a mixture Y4 containing a hydrolysate and a partially hydrolyzed condensate of the organic silicon compound-2.

(2) Preparation of Hard Coat Layer-Forming Composition

The mixture X4 and the mixture Y4 obtained as above were mixed.

Next, to the thus-obtained mixture, 356 parts by weight of colloidal titanium oxide (manufactured by JGC Catalysts and Chemicals Ltd.; commercial name: NE58) with a solid content of 30% as metal oxide particles, 16 parts by weight of acetylacetone aluminum as a metal catalyst, 390 parts by weight of methyl alcohol, and 1 part by weight of surfactant (manufactured by Dow Corning Toray Co., Ltd.; commercial name: L7001) were added, and the resulting mixture was stirred to thereby obtain a hard coat layer-forming composition H-4.

<Preparation of Hard Coat Layer-Forming Composition: H-5>

(1) Preparation of Hydrolysate

To a reaction vessel, 160 parts by weight of an organic silicon compound-1 (manufactured by Shin-Etsu Chemical Co., Ltd.; commercial name: KBM-403) was charged, and 37 parts by weight of 0.1 N aqueous hydrochloric acid solution was gradually added dropwise to the organic silicon compound-1 under stirring of the organic silicon compound-1. Thereafter, the mixture was stirred for a whole day and night, thereby obtaining a mixture X5 containing a hydrolysate and a partially hydrolyzed condensate of the organic silicon compound-1.

To another reaction vessel, 37 parts by weight of an organic silicon compound-2 (manufactured by Shin-Etsu Chemical Co., Ltd.; commercial name: KBM-4803) was charged, and 1 part by weight of 0.1 N aqueous hydrochloric acid solution was gradually added dropwise to the organic silicon compound-2 under stirring of the organic silicon compound-2. Thereafter, the mixture was stirred for a whole day and night, thereby obtaining a mixture Y5 containing a hydrolysate and a partially hydrolyzed condensate of the organic silicon compound-2.

(2) Preparation of Hard Coat Layer-Forming Composition

The mixture X5 and the mixture Y5 obtained as above were mixed.

Next, to the thus-obtained mixture, 356 parts by weight of colloidal titanium oxide (manufactured by JGC Catalysts and Chemicals Ltd.; commercial name: NE58) with a solid content of 30% as metal oxide particles, 16 parts by weight of acetylacetone aluminum as a metal catalyst, 393 parts by weight of methyl alcohol, and 1 part by weight of surfactant (manufactured by Dow Corning Toray Co., Ltd.; commercial name: L7001) were added, and the resulting mixture was stirred to thereby obtain a hard coat layer-forming composition H-5.

<Preparation of Hard Coat Layer-Forming Composition: H-6>

(1) Preparation of Hydrolysate

To a reaction vessel, 149 parts by weight of an organic silicon compound-1 (manufactured by Shin-Etsu Chemical Co., Ltd.; commercial name: KBM-403) was charged, and 34 parts by weight of 0.1 N aqueous hydrochloric acid solution was gradually added dropwise to the organic silicon compound-1 under stirring of the organic silicon compound-1. Thereafter, the mixture was stirred for a whole day and night, thereby obtaining a mixture X6 containing a hydrolysate and a partially hydrolyzed condensate of the organic silicon compound-1.

To another reaction vessel, 48 parts by weight of an organic silicon compound-2 (manufactured by Shin-Etsu Chemical Co., Ltd.; commercial name: KBM-4803) was charged, and 1 part by weight of 0.1 N aqueous hydrochloric acid solution was gradually added dropwise to the organic silicon compound-2 under stirring of the organic silicon compound-2. Thereafter, the mixture was stirred for a whole day and night, thereby obtaining a mixture Y6 containing a hydrolysate and a partially hydrolyzed condensate of the organic silicon compound-2.

(2) Preparation of Hard Coat Layer-Forming Composition

The mixture X6 and the mixture Y6 obtained as above were mixed.

Next, to the thus-obtained mixture, 356 parts by weight of colloidal titanium oxide (manufactured by JGC Catalysts and Chemicals Ltd.; commercial name: NE58) with a solid content of 30% as metal oxide particles, 16 parts by weight of acetylacetone aluminum as a metal catalyst, 395 parts by weight of methyl alcohol, and 1 part by weight of surfactant (manufactured by Dow Corning Toray Co., Ltd.; commercial name: L7001) were added, and the resulting mixture was stirred to thereby obtain a hard coat layer-forming composition H-6.

<Preparation of Hard Coat Layer-Forming Composition: H-7>

(1) Preparation of Hydrolysate

To a reaction vessel, 225 parts by weight of an organic silicon compound-1 (manufactured by Shin-Etsu Chemical Co., Ltd.; commercial name: KBM-403) was charged, and 51 parts by weight of 0.1 N aqueous hydrochloric acid solution was gradually added dropwise to the organic silicon compound-1 under stirring of the organic silicon compound-1. Thereafter, the mixture was stirred for a whole day and night, thereby obtaining a mixture X7 containing a hydrolysate and a partially hydrolyzed condensate of the organic silicon compound-1.

To another reaction vessel, 32 parts by weight of an organic silicon compound-2 (manufactured by Shin-Etsu Chemical Co., Ltd.; commercial name: KBM-4803) was charged, and 1 part by weight of 0.1 N aqueous hydrochloric acid solution was gradually added dropwise to the organic silicon compound-2 under stirring of the organic silicon compound-2. Thereafter, the mixture was stirred for a whole day and night, thereby obtaining a mixture Y7 containing a hydrolysate and a partially hydrolyzed condensate of the organic silicon compound-2.

(2) Preparation of Hard Coat Layer-Forming Composition

The mixture X7 and the mixture Y7 obtained as above were mixed.

Next, to the thus-obtained mixture, 139 parts by weight of colloidal titanium oxide (manufactured by JGC Catalysts and Chemicals Ltd.; commercial name: NE58) with a solid content of 30% as metal oxide particles, 21 parts by weight of acetylacetone aluminum as a metal catalyst, 531 parts by weight of methyl alcohol, and 1 part by weight of surfactant (manufactured by Dow Corning Toray Co., Ltd.; commercial name: L7001) were added, and the resulting mixture was stirred to thereby obtain a hard coat layer-forming composition H-7.

<Preparation of Hard Coat Layer-Forming Composition: H-8>

(1) Preparation of Hydrolysate

To a reaction vessel, 196 parts by weight of an organic silicon compound-1 (manufactured by Shin-Etsu Chemical Co., Ltd.; commercial name: KBM-403) was charged, and 45 parts by weight of 0.1 N aqueous hydrochloric acid solution was gradually added dropwise to the organic silicon compound-1 under stirring of the organic silicon compound-1. Thereafter, the mixture was stirred for a whole day and night, thereby obtaining a mixture X8 containing a hydrolysate and a partially hydrolyzed condensate of the organic silicon compound-1.

To another reaction vessel, 28 parts by weight of an organic silicon compound-2 (manufactured by Shin-Etsu Chemical Co., Ltd.; commercial name: KBM-4803) was charged, and 1 part by weight of 0.1 N aqueous hydrochloric acid solution was gradually added dropwise to the organic silicon compound-2 under stirring of the organic silicon compound-2. Thereafter, the mixture was stirred for a whole day and night, thereby obtaining a mixture Y8 containing a hydrolysate and a partially hydrolyzed condensate of the organic silicon compound-2.

(2) Preparation of Hard Coat Layer-Forming Composition

The mixture X8 and the mixture Y8 obtained as above were mixed.

Next, to the thus-obtained mixture, 256 parts by weight of colloidal titanium oxide (manufactured by JGC Catalysts and Chemicals Ltd.; commercial name: NE58) with a solid content of 30% as metal oxide particles, 18 parts by weight of acetylacetone aluminum as a metal catalyst, 455 parts by weight of methyl alcohol, and 1 part by weight of surfactant (manufactured by Dow Corning Toray Co., Ltd.; commercial name: L7001) were added, and the resulting mixture was stirred to thereby obtain a hard coat layer-forming composition H-8.

<Preparation of Hard Coat Layer-Forming Composition: H-9>

(1) Preparation of Hydrolysate

To a reaction vessel, 151 parts by weight of an organic silicon compound-1 (manufactured by Shin-Etsu Chemical Co., Ltd.; commercial name: KBM-403) was charged, and 34 parts by weight of 0.1 N aqueous hydrochloric acid solution was gradually added dropwise to the organic silicon compound-1 under stirring of the organic silicon compound-1. Thereafter, the mixture was stirred for a whole day and night, thereby obtaining a mixture X9 containing a hydrolysate and a partially hydrolyzed condensate of the organic silicon compound-1.

To another reaction vessel, 22 parts by weight of an organic silicon compound-2 (manufactured by Shin-Etsu Chemical Co., Ltd.; commercial name: KBM-4803) was charged, and 1 part by weight of 0.1 N aqueous hydrochloric acid solution was gradually added dropwise to the organic silicon compound-2 under stirring of the organic silicon compound-2. Thereafter, the mixture was stirred for a whole day and night, thereby obtaining a mixture Y9 containing a hydrolysate and a partially hydrolyzed condensate of the organic silicon compound-2.

(2) Preparation of hard coat layer-forming composition

The mixture X9 and the mixture Y9 obtained as above were mixed.

Next, to the thus-obtained mixture, 443 parts by weight of colloidal titanium oxide (manufactured by JGC Catalysts and Chemicals Ltd.; commercial name: NE58) with a solid content of 30% as metal oxide particles, 14 parts by weight of acetylacetone aluminum as a metal catalyst, 335 parts by weight of methyl alcohol, and 1 part by weight of surfactant (manufactured by Dow Corning Toray Co., Ltd.; commercial name: L7001) were added, and the resulting mixture was stirred to thereby obtain a hard coat layer-forming composition H-9.

<Preparation of Hard Coat Layer-Forming Composition: H-10>

(1) Preparation of Hydrolysate

To a reaction vessel, 147 parts by weight of an organic silicon compound-1 (manufactured by Shin-Etsu Chemical Co., Ltd.; commercial name: KBM-403) was charged, and 33 parts by weight of 0.1 N aqueous hydrochloric acid solution was gradually added dropwise to the organic silicon compound-1 under stirring of the organic silicon compound-1. Thereafter, the mixture was stirred for a whole day and night, thereby obtaining a mixture X10 containing a hydrolysate and a partially hydrolyzed condensate of the organic silicon compound-1.

To another reaction vessel, 21 parts by weight of an organic silicon compound-2 (manufactured by Shin-Etsu Chemical Co., Ltd.; commercial name: KBM-4803) was charged, and 1 part by weight of 0.1 N aqueous hydrochloric acid solution was gradually added dropwise to the organic silicon compound-2 under stirring of the organic silicon compound-2. Thereafter, the mixture was stirred for a whole day and night, thereby obtaining a mixture Y10 containing a hydrolysate and a partially hydrolyzed condensate of the organic silicon compound-2.

(2) Preparation of Hard Coat Layer-Forming Composition

The mixture X10 and the mixture Y10 obtained as above were mixed.

Next, to the thus-obtained mixture, 452 parts by weight of colloidal tin oxide (manufactured by Nissan Chemical Industries, Ltd.; commercial name: HX-305M5) with a solid content of 30% as metal oxide particles, 13 parts by weight of acetylacetone aluminum as a metal catalyst, 332 parts by weight of methyl alcohol, and 1 part by weight of surfactant (manufactured by Dow Corning Toray Co., Ltd.; commercial name: L7001) were added, and the resulting mixture was stirred to thereby obtain a hard coat layer-forming composition H-10.

<Preparation of Hard Coat Layer-Forming Composition: H-11>

(1) Preparation of Hydrolysate

To a reaction vessel, 164 parts by weight of an organic silicon compound-1 (manufactured by Shin-Etsu Chemical Co., Ltd.; commercial name: KBM-403) was charged, and 36 parts by weight of 0.1 N aqueous hydrochloric acid solution was gradually added dropwise to the organic silicon compound-1 under stirring of the organic silicon compound-1. Thereafter, the mixture was stirred for a whole day and night, thereby obtaining a mixture X11 containing a hydrolysate and a partially hydrolyzed condensate of the organic silicon compound-1.

To another reaction vessel, 24 parts by weight of an organic silicon compound-2 (manufactured by Shin-Etsu Chemical Co., Ltd.; commercial name: KBM-4803) was charged, and 1 part by weight of 0.1 N aqueous hydrochloric acid solution was gradually added dropwise to the organic silicon compound-2 under stirring of the organic silicon compound-2. Thereafter, the mixture was stirred for a whole day and night, thereby obtaining a mixture Y11 containing a hydrolysate and a partially hydrolyzed condensate of the organic silicon compound-2.

(2) Preparation of Hard Coat Layer-Forming Composition

The mixture X11 and the mixture Y11 obtained as above were mixed.

Next, to the thus-obtained mixture, 301 parts by weight of colloidal zirconium oxide (manufactured by Nissan Chemical Industries, Ltd.; commercial name: HZ-400M7) with a solid content of 40% as metal oxide particles, 15 parts by weight of acetylacetone aluminum as a metal catalyst, 332 parts by weight of methyl alcohol, and 1 part by weight of surfactant (manufactured by Dow Corning Toray Co., Ltd.; commercial name: L7001) were added, and the resulting mixture was stirred to thereby obtain a hard coat layer-forming composition H-11.

<Preparation of Hard Coat Layer-Forming Composition: H-12>

(1) Preparation of Hydrolysate

To a reaction vessel, 193 parts by weight of an organic silicon compound-1 (manufactured by Shin-Etsu Chemical Co., Ltd.; commercial name: KBM-403) was charged, and 44 parts by weight of 0.1 N aqueous hydrochloric acid solution was gradually added dropwise to the organic silicon compound-1 under stirring of the organic silicon compound-1. Thereafter, the mixture was stirred for a whole day and night, thereby obtaining a mixture X12 containing a hydrolysate and a partially hydrolyzed condensate of the organic silicon compound-1.

(2) Preparation of Hard Coat Layer-Forming Composition

To the mixture X12, 14 parts by weight of a glycoluril crosslinking agent (1,3,4,6-tetrakis(hydroxymethyl)glycoluril; manufactured by Shikoku Chemicals Corporation), 350 parts by weight of colloidal titanium oxide (manufactured by JGC Catalysts and Chemicals Ltd.; commercial name: NE58) with a solid content of 30% as metal oxide particles, 16 parts by weight of acetylacetone aluminum as a metal catalyst, 381 parts by weight of methyl alcohol, and 1 part by weight of surfactant (manufactured by Dow Corning Toray Co., Ltd.; commercial name: L7001) were added, and the resulting mixture was stirred to thereby obtain a hard coat layer-forming composition H-12.

<Preparation of Hard Coat Layer-Forming Composition: H-13>

(1) Preparation of Hydrolysate

To a reaction vessel, 169 parts by weight of an organic silicon compound-1 (manufactured by Shin-Etsu Chemical Co., Ltd.; commercial name: KBM-403) was charged, and 38 parts by weight of 0.1 N aqueous hydrochloric acid solution was gradually added dropwise to the organic silicon compound-1 under stirring of the organic silicon compound-1. Thereafter, the mixture was stirred for a whole day and night, thereby obtaining a mixture X13 containing a hydrolysate and a partially hydrolyzed condensate of the organic silicon compound-1.

To a reaction vessel, 39 parts by weight of a glycoluril crosslinking agent (1,3,4,6-tetrakis(trimethoxysilylmethyl) glycoluril; manufactured by Shikoku Chemicals Corporation) was charged, and 2 parts by weight of 0.1 N aqueous hydrochloric acid solution was gradually added dropwise to the glycoluril crosslinking agent under stirring of the glycoluril crosslinking agent. Thereafter, the mixture was stirred for a whole day and night, thereby obtaining a mixture Y13 containing a hydrolysate and a partially hydrolyzed condensate of the glycoluril crosslinking agent.

(2) Preparation of Hard Coat Layer-Forming Composition

The mixture X13 and the mixture Y13 obtained as above were mixed.

Next, to the thus-obtained mixture, 351 parts by weight of colloidal titanium oxide (manufactured by JGC Catalysts and Chemicals Ltd.; commercial name: NE58) with a solid content of 30% as metal oxide particles, 16 parts by weight of acetylacetone aluminum as a metal catalyst, 383 parts by weight of methyl alcohol, and 1 part by weight of surfactant (manufactured by Dow Corning Toray Co., Ltd.; commercial name: L7001) were added, and the resulting mixture was stirred to thereby obtain a hard coat layer-forming composition H-13.

The contents of representative components contained in the foregoing hard coat layer-forming compositions are all shown in Table 1 below.

In Table 1, "Added amount" in the "(A) Metal oxide particles" section represents the metal oxide particle content (vol %) with respect to the volume of the total solids.

In Table 1, "Added amount" in the "(B) Organic silicon compound (component X)" section and "Added amount" in the "(C) Organic silicon compound (component Y)" section respectively represent the content of the (B) organic silicon compound in mole percent and the content of the (C) organic silicon compound in mole percent with respect to the total molar quantity of the (B) organic silicon compound and the (C) organic silicon compound.

In Table 1, "Added amount" in the "(D) Glycoluril crosslinking agent" section represents the content of the (D) glycoluril crosslinking agent in mole percent with respect to the total molar quantity of the (B) organic silicon compound and the (D) glycoluril crosslinking agent.

TABLE 1

| | | Hard coat layer-forming composition | | | | | | |
|---|---|---|---|---|---|---|---|---|
| | | (A) Metal oxide particles | | (B) Organic silicon compound (component X) | | | (C) Organic silicon compound (component Y) | |
| | Type | Type | Added amount | $R_A$ | $L_A$(Total carbon atoms) | Added amount | $R_B$ | |
| Comparative example 1 | H-1 | Titanium oxide | 15 vol % | Epoxy group | 4 | 100 mol % | — | |
| Comparative example 2 | H-2 | Titanium oxide | 15 vol % | — | — | — | Epoxy group | |
| Example 1 | H-3 | Titanium oxide | 15 vol % | Epoxy group | 4 | 95 mol % | Epoxy group | |
| Example 2 | H-4 | Titanium oxide | 15 vol % | Epoxy group | 4 | 90 mol % | Epoxy group | |
| Example 3 | H-5 | Titanium oxide | 15 vol % | Epoxy group | 4 | 85 mol % | Epoxy group | |
| Example 4 | H-6 | Titanium oxide | 15 vol % | Epoxy group | 4 | 80 mol % | Epoxy group | |
| Example 5 | H-7 | Titanium oxide | 5 vol % | Epoxy group | 4 | 90 mol % | Epoxy group | |
| Example 6 | H-8 | Titanium oxide | 10 vol % | Epoxy group | 4 | 90 mol % | Epoxy group | |
| Example 7 | H-9 | Titanium oxide | 20 vol % | Epoxy group | 4 | 90 mol % | Epoxy group | |
| Example 8 | H-10 | Tin oxide | 15 vol % | Epoxy group | 4 | 90 mol % | Epoxy group | |
| Example 9 | H-11 | Zirconium oxide | 15 vol % | Epoxy group | 4 | 90 mol % | Epoxy group | |
| Example 10 | H-12 | Titanium oxide | 15 vol % | Epoxy group | 4 | 95 mol % | — | |

TABLE 1-continued

| | | | | | | |
|---|---|---|---|---|---|---|
| Example 11 | H-13 | Titanium oxide | 15 vol % | Epoxy group | 4 | 95 mol % | — |

| | Hard coat layer-forming composition | | | | |
|---|---|---|---|---|---|
| | (C) Organic silicon compound (component Y) | | | (D) Glycoluril crosslinking agent (component Y) | |
| | $L_B$(Total carbon atoms) | Added amount | $R_C$ | $L_C$(Total carbon atoms) | Added amount |
| Comparative example 1 | — | — | — | — | — |
| Comparative example 2 | 9 | 100 mol % | — | — | — |
| Example 1 | 9 | 5 mol % | — | — | — |
| Example 2 | 9 | 10 mol % | — | — | — |
| Example 3 | 9 | 15 mol % | — | — | — |
| Example 4 | 9 | 20 mol % | — | — | — |
| Example 5 | 9 | 10 mol % | — | — | — |
| Example 6 | 9 | 10 mol % | — | — | — |
| Example 7 | 9 | 10 mol % | — | — | — |
| Example 8 | 9 | 10 mol % | — | — | — |
| Example 9 | 9 | 10 mol % | — | — | — |
| Example 10 | — | — | Hydroxy group | 2 | 5 mol % |
| Example 11 | — | — | Trimethoxysilyl group | 2 | 5 mol % |

<Preparation of Primer Layer-Forming Composition: P-1>

To 90 parts by weight of water dispersible polyurethane (manufactured by DRS Co. Ltd.; commercial name: SUPERFLEX 460) with a nonvolatile content of 40%, tin oxide with a solid content of 30% as an antistatic material, 370 parts by weight of colloidal antimony pentoxide (manufactured by Nissan Chemical Industries, Ltd.; commercial name: HX-307WM1), 539 parts by weight of methyl alcohol, and 1.0 part by weight of surfactant (manufactured by Dow Corning Toray Co., Ltd.; commercial name: L7001) were added, and the resulting mixture was stirred to thereby obtain a primer layer-forming composition P-1.

<Production of Optical Members in Examples and Comparative Examples>

The primer layer-forming composition P-1 was applied onto a plastic base by dip coating to thereby form a coating. Next, the coating was cured by heating at 70° C. for 20 minutes to thereby form a primer layer (thickness: 1 μm).

Subsequently, each of the hard coat layer-forming compositions H-1 to H-13 described above was applied onto the primer layer by dip coating to thereby form a coating. Next, the coating was cured by heating at 100° C. for 3 hours to thereby form a hard coat layer (thickness: 2 μm).

Then, an antireflective layer and a water and oil repellent layer were formed according to the procedures described in (Formation of Antireflective Layer) and (Formation of Water and Oil Repellent Layer) below, thus producing an optical member including the primer layer, the hard coat layer, the antireflective layer and the water and oil repellent layer in this order on the plastic base.

(Formation of Antireflective Layer)

The plastic lens base on which the primer layer and the hard coat layer had been formed was placed in a vapor deposition device to deposit a vapor deposition material onto the hard coat layer by an electron beam heating process. The structure of the antireflective layer is stated below in order from the hard coat layer side.

First layer: $SiO_2$ nd=0.1λ, nλ=30 nm
Second layer: $ZrO_2$ nd=0.16λ, nλ=37 nm
Third layer: $SiO_2$ nd=0.06λ, nλ=20 nm
Fourth layer: $ZrO_2$ nd=0.25λ, nλ=58 nm
Fifth layer: $SiO_2$ nd=0.28λ, nλ=93 nm The five layers above were formed, thus forming the antireflective layer. In the above, nd represents the refractive index, and nλ represents the film thickness.

<Formation of Water and Oil Repellent Layer>

In Novec HFE-7200 fluorine solvent (796 parts by weight) manufactured by Sumitomo 3M Limited, 4 parts by weight of KY-130 (water and oil repellent concentration: 20%) was dissolved to thereby obtain 0.1 wt % water and oil repellent. The plastic lens base having the antireflective layer was immersed in the thus-obtained solution for 5 seconds, subsequently pulled out at a rate of 10 mm/sec and then heated at 50° C. for 60 minutes, thereby forming the water and oil repellent layer.

<Evaluations>

Properties of optical members in Examples and Comparative Examples were measured by the test methods described below. The results are all shown in Table 2.

(Crack Resistance Evaluation)

Crack resistance was evaluated with a device used for lens shape machining. For a lens edger, LE-9000SX manufactured by NIDEK Co., Ltd. was used.

A cup for a lens edger (a half-eye lens cup manufactured by NIDEK Co., Ltd.) was adhered to the optical center of each of the optical members in Examples and Comparative Examples produced according to the foregoing procedures by the aid of locking tape (LEAPIII) manufactured by 3M. Subsequently, the optical member was mounted on the lens edger with the chucking pressure being adjusted to 70 kg or 85 kg and was subjected to lens edging to a predetermined lens shape. Thereafter, the optical member thus worked was washed with acetone to remove dirt. Then, whether a crack was present or not in the optical member was visually observed in front of a blackout curtain and under a fluorescent lamp and a light condensing lamp. The evaluation was made according to the following criteria. "Good" or a higher evaluation result is preferred in practical use.

Excellent: No crack occurred.
Good: A tiny crack observable with the light condensing lamp occurred.
Average: A tiny crack observable with the fluorescent lamp occurred.
Poor: A large crack observable with the fluorescent lamp occurred.

(Scratch Resistance Evaluation)

The surface (on the water and oil repellent layer side) of each optical member was rubbed back and forth 30 times with steel wool under a load of 600 g. Thereafter, the optical member was washed with acetone to remove dirt. Then, whether a scratch was present or not in the optical member was visually observed in front of a blackout curtain and under a fluorescent lamp. The evaluation was made according to the following criteria. "Average" or a higher evaluation result is preferred in practical use.
Good: Shallow scratches were present but in small numbers and were not noticeable.
Average: Shallow scratches were present in large numbers and noticeable.
Poor: Deep scratches were present in large numbers and remarkably noticeable.

TABLE 2

|  | Hard coat layer-forming composition | Crack resistance 70 kg | Crack resistance 85 kg | Scratch resistance |
|---|---|---|---|---|
| Comparative example 1 | H-1 | Poor | Poor | Good |
| Comparative example 2 | H-2 | Excellent | Excellent | Poor |
| Example 1 | H-3 | Good | Good | Good |
| Example 2 | H-4 | Excellent | Good | Good |
| Example 3 | H-5 | Excellent | Good | Average |
| Example 4 | H-6 | Excellent | Good | Average |
| Example 5 | H-7 | Excellent | Excellent | Average |
| Example 6 | H-8 | Excellent | Excellent | Good |
| Example 7 | H-9 | Good | Good | Good |
| Example 8 | H-10 | Excellent | Good | Good |
| Example 9 | H-11 | Excellent | Good | Good |
| Example 10 | H-12 | Good | Good | Average |
| Example 11 | H-13 | Good | Good | Average |

Table 2 reveals that optical members each having a hard coat layer formed from a predetermined hard coat layer-forming composition exhibited desired effects.

In particular, it was confirmed from comparison of Examples 1 to 4 that when the component Y content was not less than 5 mol % but less than 15 mol %, scratch resistance was "Good," thus achieving a further excellent effect.

It was also confirmed from comparison of Examples 2, 5, 6 and 7 that when the metal oxide particle content was in the range from 10 to 20 volt with respect to the volume of the total solids of the relevant hard coat layer-forming composition, scratch resistance was more excellent.

It was also confirmed from comparison of Examples 2, 10 and 11 that when the organic silicon compound represented by Formula (2) (or a hydrolysate or a hydrolyzed condensate thereof) was used as the component Y, further excellent effects were achieved.

In contrast, in Comparative Examples 1 and 2 in which the component X or Y was not used, desired effects were not achieved.

As described above, the present inventor has made an intensive study and as a result found that use of a predetermined compound enables to provide a hard coat layer-forming composition that can form a hard coat layer having excellent scratch resistance and crack resistance.

In addition, the present inventor found that it is possible to provide an optical member including the hard coat layer formed from the hard coat layer-forming composition.

Specifically, the present inventor found that it is possible to provide the hard coat layer-forming composition and the optical member by the characteristic features below.

(1) A hard coat layer-forming composition used to form a hard coat layer on a plastic base, the hard coat layer-forming composition comprising:
  metal oxide particles;
  a component X that is at least one selected from the group consisting of an organic silicon compound represented by Formula (1) stated above, a hydrolysate thereof and a hydrolyzed condensate thereof; and
  a component Y that is at least one selected from the group consisting of an organic silicon compound represented by Formula (2) stated above, a hydrolysate thereof and a hydrolyzed condensate thereof, and a glycoluril crosslinking agent represented by Formula (3) stated above, a hydrolysate thereof and a hydrolyzed condensate thereof.
(2) The hard coat layer-forming composition according to (1),
  wherein a content of the component Y is not less than 5 mol % with respect to a total molar quantity of the component X and the component Y.
(3) The hard coat layer-forming composition according to (1) or (2),
  wherein the metal oxide particles comprise particles formed from at least one selected from the group consisting of titanium oxide, tin oxide, zirconium oxide and a composite oxide thereof.
(4) The hard coat layer-forming composition according to any one of (1) to (3),
  wherein a content of the metal oxide particles is 10 to 20 vol % with respect to a volume of total solids of the hard coat layer-forming composition.
(5) An optical member, comprising:
  a plastic base; and
  a hard coat layer produced from the hard coat layer-forming composition according to any one of (1) to (4) and disposed on the plastic base.

REFERENCE SIGNS LIST 10, 100 optical member
12 plastic base
14 hard coat layer
16 primer layer
18 antireflective layer
20 water and oil repellent layer

The invention claimed is:

1. A hard coat layer-forming composition used to form a hard coat layer on a plastic base, the hard coat layer-forming composition comprising:
  metal oxide particles;
  a component X that is at least one selected from the group consisting of an organic silicon compound represented by Formula (1), a hydrolysate thereof and a hydrolyzed condensate thereof:

$$(RA\text{-}LA)_n\text{-}Si\text{—}(X)_{4-n} \qquad \text{Formula (1)}$$

where RA denotes an epoxy group; LA denotes an alkylene group that has 5 or less total carbon atoms and that optionally includes a heteroatom; X denotes a hydrolyzable group; and n denotes an integer of 1 to 3; and
  a component Y that is at least one selected from the group consisting of an organic silicon compound represented by Formula (2), a hydrolysate thereof and a hydrolyzed condensate thereof:

$$(RB\text{-}LB)_m\text{-}Si\text{—}(X)_{4-m} \qquad \text{Formula (2)}$$

where RB denotes an epoxy group; LB denotes an alkylene group that has 6 or more total carbon atoms and that optionally includes a heteroatom; X denotes a hydrolyzable group; and m denotes an integer of 1 to 3, wherein a content of the component Y is not less than 5 mol % and not more than 25 mol % with respect to a total molar quantity of the component X and the component Y.

2. The hard coat layer-forming composition according to claim 1, wherein the metal oxide particles comprise particles formed from at least one selected from the group consisting of titanium oxide, tin oxide, zirconium oxide and a composite oxide thereof.

3. The hard coat layer-forming composition according to claim 1, wherein a content of the metal oxide particles is 10 to 20 vol % with respect to a volume of total solids of the hard coat layer-forming composition.

4. An optical member, comprising:

a plastic base; and a hard coat layer produced from the hard coat layer-forming composition according to claim 1 and disposed on the plastic base.

* * * * *